United States Patent Office  3,369,463
Patented Feb. 20, 1968

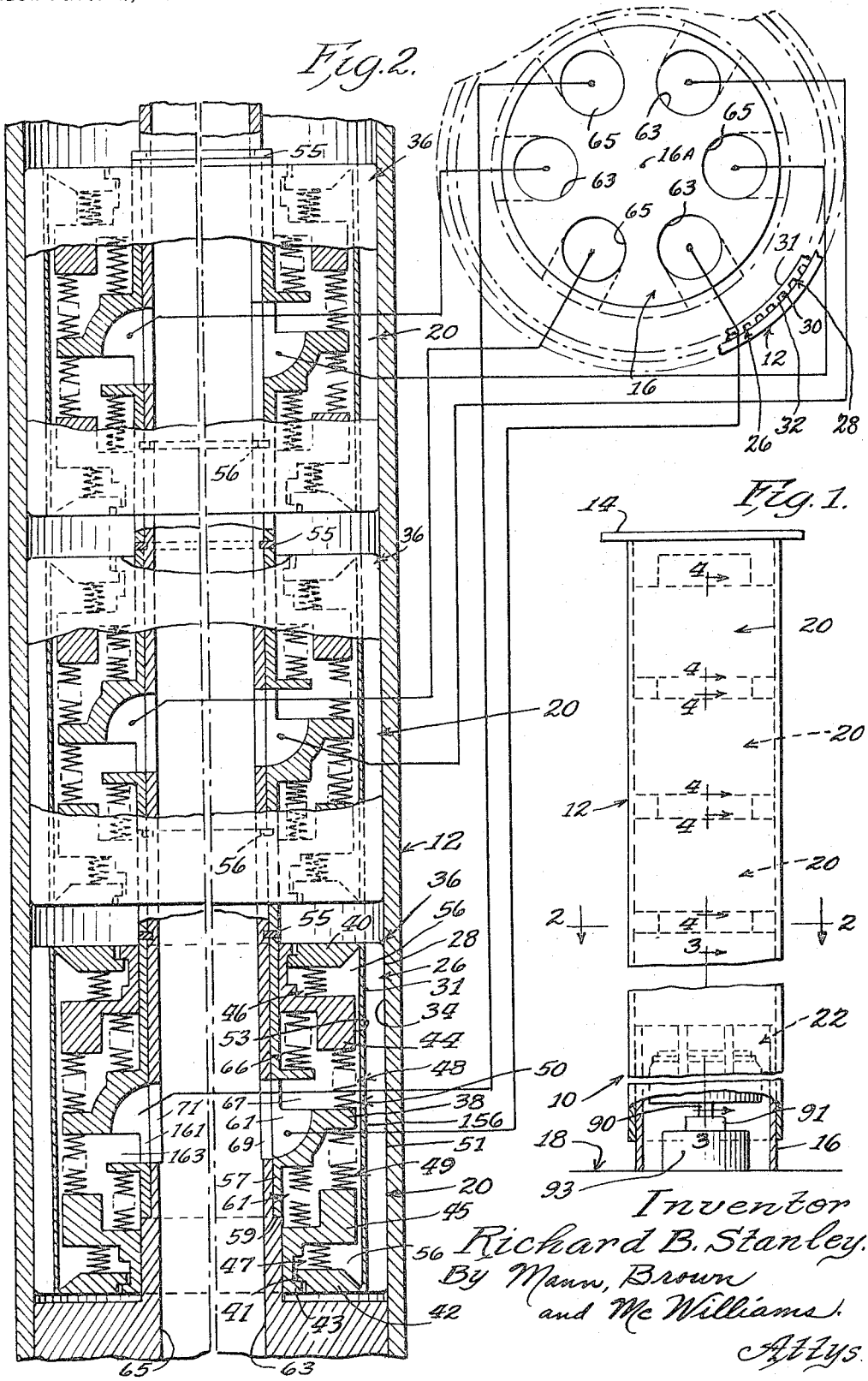

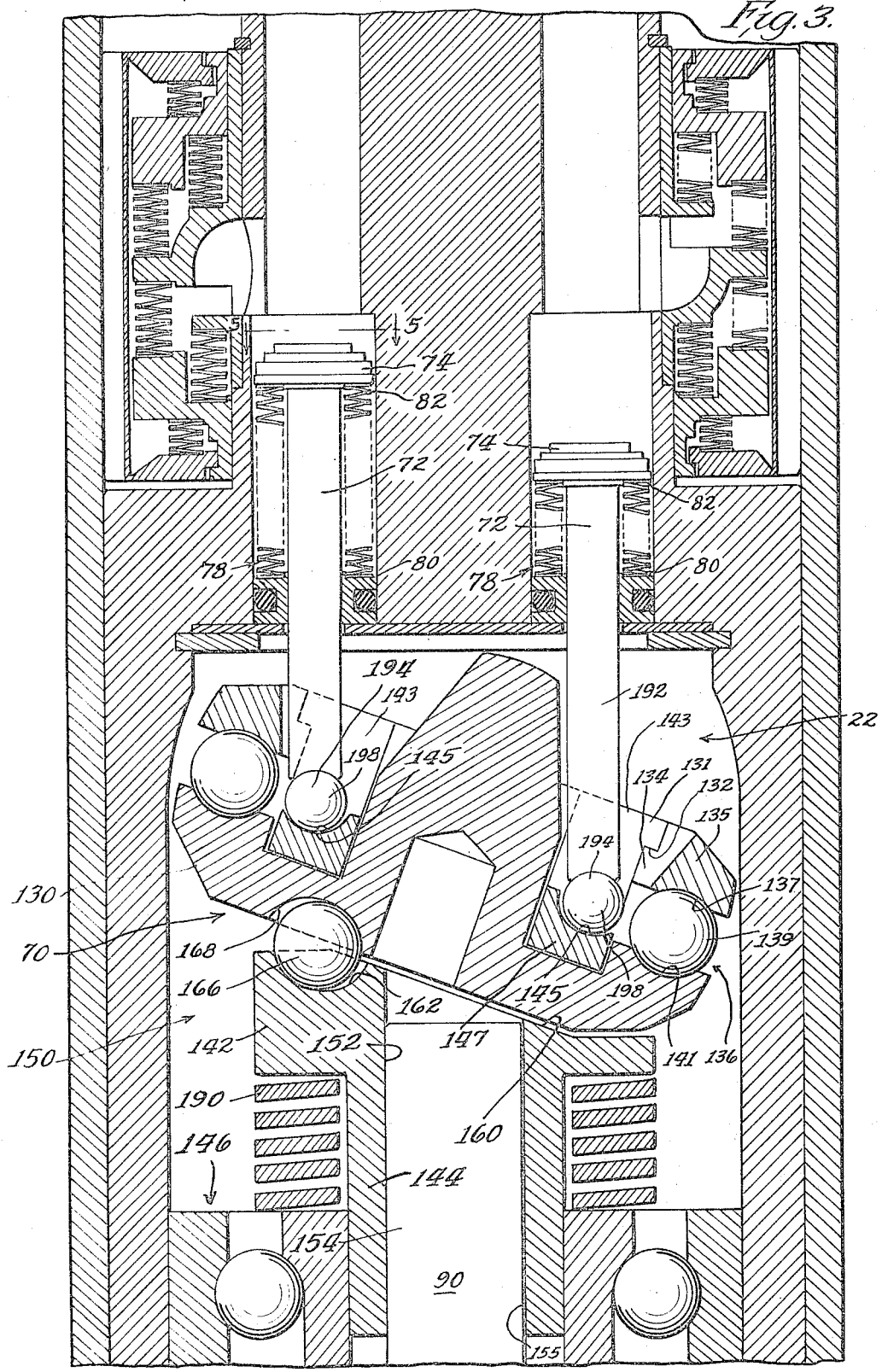

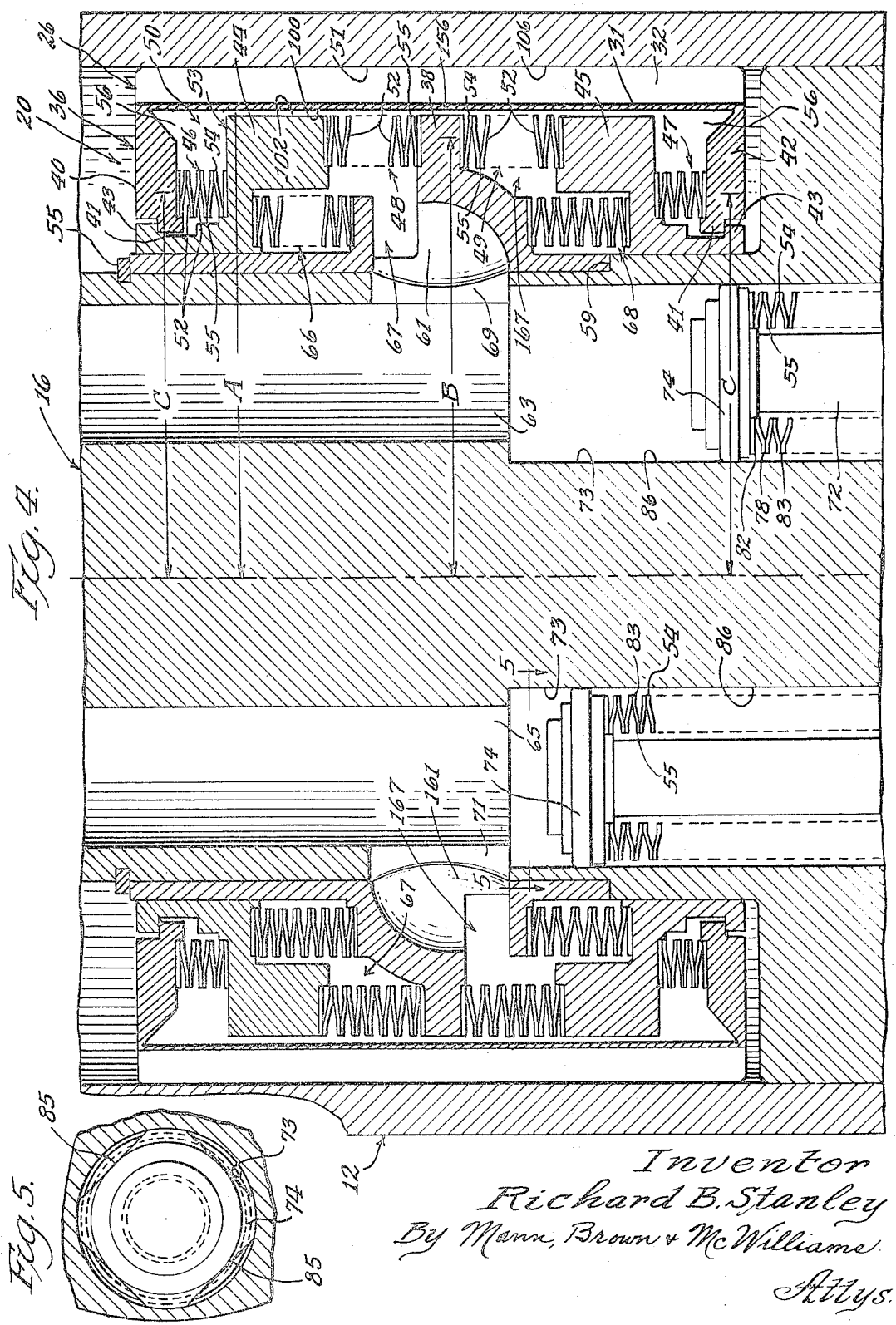

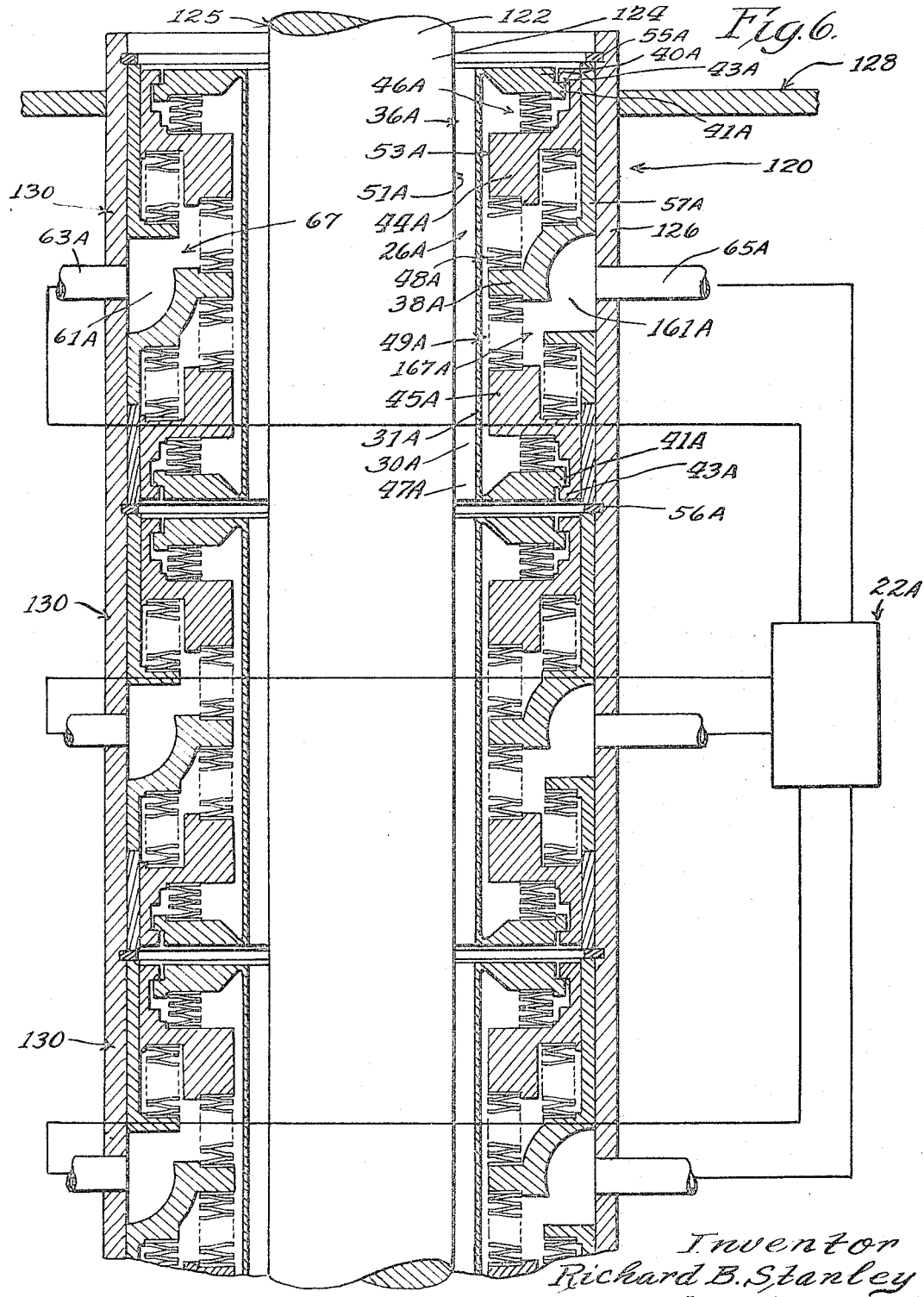

3,369,463
LINEAR ACTUATOR
Richard B. Stanley, 618 Edgemont Lane,
Park Ridge, Ill. 60068
Continuation-in-part of application Ser. No. 524,037,
Feb. 1, 1966. This application Mar. 2, 1967, Ser.
No. 619,988
12 Claims. (Cl. 91—413)

ABSTRACT OF THE DISCLOSURE

My invention relates to a linear actuator, and more particularly, to a device for converting rotary motion to linear motion, or vice versa, employing a novel and highly simplified hydraulic collet device for gripping the member to be moved, which involves a series of hermetically sealed bladders or chambers filled with hydraulic liquid and arranged to lock and release in a sequential manner to effect a step by step relative movement of, or a secure holding action between, two telescopingly related members under infinitely variable load conditions between no load and maximum design conditions of the device.

---

This application is a continuation-in-part of my pending application Ser. No. 524,037, filed Feb. 1, 1966, and involves the hydraulic wedge type locking principles described in my now abandoned applications Ser. Nos. 513,-360, filed Dec. 13, 1965 and 585,017, filed Oct. 7, 1966 (the disclosures of all said applications being incorporated herein by this reference).

Conventional linear actuator devices employ complicated hydraulics and/or gearing levers, couplings, and the like that operate at a relatively low efficiency and that are expensive to make and maintain due to the complex construction involved.

A principal object of my invention is to provide a step-by-step linear actuator that not only operates at an efficiency on the order of 85 percent under an infinite variety of load conditions up to the maximum capacity of the unit, but which also is greatly simplified and compact in arrangement.

Another principal object of the invention is to provide a hydraulically actuated linear actuator that is hermetically sealed and requires only about one-third of the volume of hydraulic liquid used in conventional devices of this type.

Still another principal object of the invention is to provide a linear actuator involving members in telescoping relation employing a novel hydraulic collet or lock device that provides instantaneous locking and release.

Other objects of the invention are to provide a basic organization for a linear actuator that is equally suited for embodiment in either massive structures such as automobile rack lifts or miniaturized push-pull devices that may have a diameter or the thickness on the order of an inch and a half, to provide novel collet type locking devices and static seals for use in my linear actuator arrangement, and to provide a linear actuator that is economical of manufacture, convenient in use and readily adapted for a wide variety of applications.

Other objects, uses, and advantages will be obvious or become apparent from a consideration of the following detailed description and the application drawings.

In the drawings:

FIGURE 1 is a diagrammatic, small scale, side elevational view of a jack embodying the basic features of the invention, with parts broken away;

FIGURE 2 is a composite illustration combining a transverse sectional view of the device taken substantially along line 2—2 of FIGURE 1 and a fragmental longitudinal section view of the device (in which the axial center portion has been broken away for space saving purposes but see FIGURES 3 and 4), showing schematically the manner in which the hydraulic conduiting of the jack is connected between the respective collet devices of the jack and the jack actuating pump;

FIGURE 3 is a longitudinal cross-sectional view taken substantially along line 3—3 of FIGURE 1 illustrating the structural features of the wobble plate type pump employed in the illustrated jack together with the adjacent collet devices;

FIGURE 4 is similar to that of FIGURE 3 but is representative of the structural features shown by viewing along each of the lines 4—4 of FIGURE 1;

FIGURE 5 is a fragmental view taken substantially along line 5—5 of FIGURE 4; and FIGURE 6 is a view similar to those of FIGURES 2, 3, and 5, but illustrating a modified form of the invention.

However, it is to be distinctly understood that the specific drawing illustrations provided are supplied primarily to comply with the requirements of the Patent Code and that the invention may have many other specific embodiments that will be obvious to those skilled in the art.

GENERAL DESCRIPTION

Reference numeral 10 of FIGURE 1 generally indicates a jack device embodying the basic features of the present invention and comprising a vertically movable tubular member 12 carrying at its upper end a support platform 14 for engaging and supporting a load to be lifted. Tubular member 12 is received over a support member 16 which has its lower end engaging a suitable support or base structure 18, such as a foundation arranged to support the device 10 and its load.

Associated with the support 16 are three lifting and locking devices 20, located approximately where indicated by the reference numerals 20 in the illustration of FIGURE 1, and a hydraulic actuator unit 22 located approximately where indicated by reference numeral 22 of FIGURE 1.

Referring to FIGURES 2 and 4, each device 20 comprises a sleeve 26 received between the members 12 and 16 and having its periphery 28 formed with a plurality of closely spaced longitudinally extending recesses 30 (see the transverse section of FIGURE 2) which are sufficiently deep that they leave a connecting web 31 between the resulting ribs 32 that is on the order of five thousandths of an inch. It is intended that the respective sleeves 26 not be split or entirely severed by the recesses 30, although it is intended that the respective sleeves will expand somewhat when pressed against the internal surface 34 of tubular member 12 during operation of the respective devices 20.

Each of the sleeves 226, in accordance with the improvement of this application, forms a part of an annular collet member or device 36 that at its ends includes relatively thick annular flange members 40 and 42, respectively (which in the form shown are integral with the respective sleeves 26), piston members 44 and 45, flexible static seal devices 46 and 47 secured between the respective flange members 40 and 42, and flexible static seal devices 48 and 49 that are secured between the respective pistons 44 and 45 and an abutment member 38 that is fixed with respect to support member 16. The respective flange members 40 and 42 are formed with shoulders 41 that engage shoulders 43 of the respective piston members 44 and 45.

The collet members 36 are annular in nature and each defines an outer side wall 51 (that defines periphery 28 of sleeve 26) and an inner side wall 53 which are united by the above mentioned components that make up the individual collet members 36. The inner wall 53 is of stepped diameter configuration and the seals 48 and 49, which are formed by a plurality of annular discs 52 brazed together at alternate edges 54 and 55, provide a measure of flexibility in the walls 53 of the respective devices 36 longitudinally of their respective central axes that permit them to shift a limited amount in either direction axially of member 16.

The respective devices 36 thus each define an annular hydraulic chamber 50 which is intended to be completely filled with hydraulic liquid. Abutment 38 is part of a sleeve 57 received about member 16 between spaced locking rings 55 and 56, or in the case of the lowermost device 36, a ring 55 and shoulder 59. Sleeve 57 defines ports 61 and 161 which lead to hydraulic actuation chambers 67 and 167 that are defined by the abutment 38, the respective seals 48 and 49, pistons 44 and 45 and static type seal devices 66 and 68 that are similar to seals 46 and 47 and are applied between the respective pistons and the sleeve 57 in the manner indicated in FIGURE 4.

It will be noted that the chamber 50 of each device 36 extends between the opposite end portions 56 thereof, abutment 38 and pistons 44 and 45 being dimensioned to extend short of sleeve 26 (see FIGURE 4).

The member 16 is formed to define ports 69 and 71 which communicate with the respective actuation chambers 67 and 167 together with a conduit passage 63 for each port 69 and a separate conduit passage 65 for each port 71. As indicated in FIGURE 2, the passages 63 and 65 are equally distributed around the central axis 16A of member 16, and at their lower ends the respective passages 63 and 65 communicate with the respective piston chambers 73 formed in the base of the member 16 to form part of the hydraulic actuating device 22 (see FIGURE 4).

The hydraulic actuating device 22 is located in the specific arrangement of FIGURES 1–5 where generally indicated by reference numeral 22 in FIGURE 1 and comprises a wobble plate structure 70 actuating a plurality of piston rods 72 which in turn actuate piston members 74 operating in piston chambers or bores 73.

As indicated in FIGURE 2, in the specific arrangement shown the piston chambers 73 and their corresponding passages 63 and 65 are six in number.

Each piston rod 72 and piston member 74 has associated therewith a special static type seal 78 which are similar to seals 46 and having its end portion 80 affixed as by brazing to the member 16 as at 81 and its end portion 82 affixed as by brazing to the piston member 74.

The piston chambers 73 are preferably made cylindrical in configuration while the piston members 74 are polygonal in configuration (see FIGURE 5).

It is intended that the connections of the seal 78 at its end portion 80 and at piston member 74 be leak-proof, and that hydraulic liquid, such as a suitable oil, completely fill the space within the chambers 67, 167, ports 61, 161, 69 and 71, passages 63 and 65, and the portions of piston chamber 73 that are externally of the respective seals 78. Consequently, hydraulic liquid is disposed around the external surfaces 83 of the respective seals 78 and passes between the planar sides 85 of the piston member and the wall 86 defining the respective bores 73.

The wobble plate structure 70 is rotated by shaft 90 that is actuated by a suitable electric motor or the like generally indicated at 91 in FIGURE 1. Preferably, a suitable magnetic brake device indicated at 93 is operably associated with the shaft 90 and is electrically connected so that when motor 91 is turned off, the magnetic brake is turned on and maintains shaft 90 against rotation. This may be done in any suitable manner that will be immediately apparent to those skilled in the art.

When it is desired to raise a load resting on platform 14, the wobble plate structure 70 is actuated by releasing brake 93 and operating motor 91 to rotate shaft 90 in the appropriate direction to reciprocate piston rods 72 and thus piston members 74. As the wobble plate structure 70 rotates, the piston members 74 reciprocate within their respective bores or chambers 73.

The orientation of the wobble plate structure 70 with respect to the collet members or devices 36 is such that when the shaft 90 is turned in one direction of rotation, hydraulic liquid is displaced from the respective piston chambers 73 into the respective actuation chambers 67 while simultaneously a corresponding amount of hydraulic liquid is displaced from the respective actuation chambers 167 and returns to the piston chambers to which they are connected through passages 65.

The collet members or devices 36 are arranged in accordance with the teachings of my said copending applications Ser. Nos. 513,360 and 585,017, and it will be noted that their side portions 51 and 53 are not of a uniform distance apart throughout the length of the respective collet members, but rather at the ends 56 of these devices the side portions 51 and 53 define between them a cross-sectional area for chamber 50 transversely of the members 12 and 16 that is larger than at the intermediate portions 156 of these members.

More specifically, on referring to FIGURES 3 and 4 it will be seen that at the intermediate portion 156 of the collet device 36, the transverse cross-sectional area defined by the internal sides 100 and 102 of the chamber 50 is equivalent to the area obtained by using the radius indicated by dimension A (the internal diameter of the collet member side wall 51) employed as a factor in the usual circle area formula ($\pi R^2$) minus the area obtained by multiplying in the same formula the radius indicated by dimension B (the radius extending to the average lateral width of the discs 52 of seals 48 and 49).

However, at the ends 56 end of the collet members 36, the transverse cross-sectional area of the chamber 50 is equal to the area obtained by using the radius indicated by the aforementioned dimension A used as a factor in the usual area formula for a circle, and subtracting the area obtained by using the radius indicated by the dimension C (with the radius C extending to the average lateral width of the discs 52 forming the respective seals 46 and 47, as this gives the effective internal diameter dimension at the ends 56 of the respective collet members 36).

For purposes of description I prefer to refer to the area obtained by subtracting the area of the circle having the radius C from the area of the circle having the radius B as the effective diametrical area, or the effective compressing width area, of the respective members or devices 36, and specifically chambers 50, for reasons that will now be described. This effective diametrical area will be hereinafter referred to for identification purposes as area X to simplify the terms used in the subsequent description.

In accordance with my said applications, the collet members or devices 36 are proportioned in length with respect to this area X so that the ratio of the area X over the area of contact of the respective collet devices with the internal surface 106 of the tubular member 12 is no greater than the coefficient of friction between the respective collet devices and the member 12. In other words, the ratio of the effective diametrical area X to the area of contact between the external surfaces of peripheries 28 of the respective collet members 36 and the internal surface 106 of the member 12 should be equal to or less than the coefficient of friction between these surfaces. Sleeves 26 and member 12 will need to be proportioned accordingly in view of the recesses 30 that are formed in surface 28 of sleeve 26 (sleeve 26 would be longer than it need be if recesses 30 were lacking).

I have found that when this dimensioning is observed, and the tubular member 12 is urged longitudinally of member 16, the collet member 36 under the frictional forces acting between the collet member and surface 106 of the member 12 will tend to move downwardly of member 16 and thus tend to reduce the volume of the chamber 50 of this device at the upper end thereof. Assuming that that the wobble plate structure 70 is stationary, the lower end of the collet device tends to move piston 45, through the lower engaged shoulders 41 and 43, downwardly in like manner, thus maintaining the original spaced relation between the collet flange member 42 and piston member 45, and thus there is no place for the hydraulic liquid in the chamber 50 of the device 36 or that in chamber 67; the hydraulic liquid in chamber 50 tends to be compressed, and the pressure within the chamber 50 increases thereby causing the periphery 28 of the collet device 36 to be firmly pressed against the inner surface 106 of the member 12 and thereby not only prevent relative movement between the collet member 36 and the member 12, but also cause the sleeve 26 to be firmly pressed and hydraulically clamped against the internal surface 106 of member 12. This same action occurs for movements in member 12 in the opposite direction for similar reasons, and thus the hydraulic lock provided by device 36 is double acting.

In the particular assembly of members 36 that is herein disclosed, as soon as the load is applied to the platform 14, the tubular member 12 is instantaneously gripped from being moved downwardly with respect to support 16 by the devices 36, as hydraulic liquids employed are substantially incompressible and there would be no noticeable movement of the member 12 downwardly of the support 16 in effecting the locking action of such devices (assuming the wobble plate is locked against rotation).

The weight of the load acting on the tubular member 12 creates a frictional force on the respective sleeves 26 which at their upper ends tends to move them downwardly and thus tends to move the respective top end flanges 40 against the hydraulic liquid in chamber 50 with the result that the top flange acts as a piston-like member on the liquid within the chambers 50 of the respective devices 36 to provide the pressure on the hydraulic liquid that effects the locking action achieved by the collet members 36, all without operation of wobble plate structure 70. The other end flanges 42 move with their respective sleeves 26 and draw with them pistons 45 through their interengaging shoulders 41 and 43, thus avoiding a change in the spaced relation between flanges 42 and pistons 45 and permitting the hydraulic lock to be formed that holds sleeves 25 with respect to pistons 44. Sleeve members 16 are supported against further lowering movement because of the holding action the locked wobble plate has on hydraulic liquid flow and the incompressible nature of the hydraulic liquid, thus prohibiting the pistons 44 from moving with respect to support 16. Thus, in supporting a static load, the devices 36 form a wedge between the tubular member 12 and the support member 16 through the pistons 44 and the hydraulic liquid intervening between same and the locked wobble plate.

It is to be noted that in the form shown the proportioning of the side walls 51 and 53 of the members 36 that provides the area X dimensioning indicated is an essential to the practice of my invention as it is the presence of the effective diametrical area X that, in addition to the cooperation between shoulders 41 and 42 at the lower end of members 36, serves to reduce or decrease the volume of chamber 50 when wobble plate structure 70 is not functioning. This is what holds the load in the stationary position (assuming shaft 90 is braked against rotation). However, the shaping of the parts to achieve this end is largely optional as will now be apparent to those skilled in the art.

When it is desired to raise the load, the motor 91 is actuated to rotate the shaft 90 in the direction that will supply hydraulic liquid to the actuation chambers 67 of the respective members 36 and withdraw a corresponding amount of hydraulic liquid from their actuation chambers 167. As the piston member 74 of a particular chamber 73 moves upwardly of the showing of FIGURE 4 and thus away from the wobble plate structure 70, its seal 78 expands, which thus displaces the hydraulic liquid in the piston chambers 73 in question, which effects an increase in the pressure of the hydraulic liquid within the actuation chamber 67 that is connected to the conduit 63 in question. The increase in pressure within the actuation chamber 67 in question tends to expand it, thus lifting piston member 44 and consequently the entire collet device and the load it carries (through the friction forces acting between it and member 12).

The lifting action on the device 36 causes piston 45 to contract actuation chamber 167 with the piston 74 in the piston chamber serving the chamber 167 in question withdrawing a corresponding amount of hydraulic liquid from said chamber 167.

FIGURE 3 indicates the fully extended and retracted position of certain of the piston members 74 within the respective chambers 73.

Further in accordance with this invention, the conduits 63 and 65 alternate about the longitudinal axis of support 16 (see FIGURE 2), and the chambers 67 associated with the respective members or devices 36 are connected to passages 63 that are spaced 120 degrees apart about said axis while the chambers 167 associated with the members 36 are connected to the alternate passages 65 that are likewise spaced 120 degrees apart about said axis. Furthermore, the connections of the respective passages 63 and 65 to the respective members 36 and 38 are made such that a uniform holding or lifting action is provided on the member 12.

To achieve this, the orientation of the parts is made such that when the power stroke which effects the lifting action of one of the collet devices 36 is being completed, the power stroke of another collet device 36 is just starting to provide the same effective lifting action on the member 12. Thus, in accordance with the present invention, the action of the various pistons is such that the lifting actions affected by the individual collet devices 36 are blendingly related throughout the cycle of the hydraulic mechanism so that a continuous lifting action is applied to member 12 by the respective collet device 36, but in consecutive step-by-step manner. In other words, it is intended that as the lifting action or thrust provided by one of the devices 36 falls off at the end of the power stroke of its piston member 74, the lift action or thrust provided by another device 36 is building up in the same proportion and the third device 36 is in the mid portion of its thrust applying stroke and provides a lifting action equivalent to the sum of the lifting actions provided by the other two devices 36, thus insuring the application of a uniform lifting action on member 12 that will be constant if the speed of wobble plate structure 70 is constant.

As the end of the power strokes for the pistons 74 serving a particular actuation chamber 67, the motion of the piston 74 is reversed, as is that of the piston 45 serving the chamber 167 of the same device 36. Chamber 167 of the device 36 in question will therefore expand and its opposite chamber 67 will contract under the pumping action involved on the hydraulic liquid, which will return the collet device in question to its original position with respect to support 16; thus, the piston member 45 will be forced downwardly of support 16, drawing sleeve 26 and piston with it, and as the movement of piston 45 downwardly of member 16 releases the pressure on chamber 50, sleeve 26 of the device 36 in question readily changes position with respect to member 12 while the sleeves 26 of the remaining devices 36 hold up the load.

When the weight being lifted has been moved to the height desired, the motor 91 is shut off, which, in accordance with the described arrangement automatically puts magnetic brake 93 into locking engagement with the shaft 90. The load will thus be maintained at its achieved elevation indefinitely so long as the magnetic brake is not released because of the hydraulic wedge gripping action of members 36.

When it is desired to lower the load, the action of the hydraulic mechanism is reversed, that is, the shaft 90 is rotated in the opposite direction to effect a similar but reversed action on the devices 36. Thus, when the jack 10 is being lowered, it is the actuation chambers 167 of the respective devices 36 that are first expanded on the power stroke device 10 while the chambers 67 contract, with the members 36 being restored to their initial positions by continued operation of the wobble plate structure to effect the return strokes of the piston members 74.

If desired, the load will lower itself once the magnetic brake is released, and consequently it is not necessary to start the motor 91 to lower the load. This is because the frictional action of the sleeves 26 will effect a displacement action on the hydraulic liquid through the compression of the respective chambers 67 and expansion of chamber 167 that actuates the wobble plate structure 70 and in effect "pumps" down the load.

FIGURE 2 illustrates diagrammatically the way that the various liquid supply passages may be connected between the various conduits 63 and 65 and the various chambers 67 and 167 operating the collet devices 36.

Referring now to the embodiment of FIGURE 6, reference numeral 120 indicates a step-by-step linear actuator in which the action of the collet members is inwardly rather than outwardly. The device 120 is assumed to be incorporated in a piece of machinery requiring the movement of horizontally disposed shaft 122 in either direction for some manufacturing procedure, and it is understood that the shaft 122 is a straight smooth shaft with a cylindrical external surface 124, insofar as the portion 125 that extends through the device 120 is concerned.

The device 120 comprises a tubular shell or sleeve 126 mounted in any suitable manner within the machinery housing 128 and fixed against movement with respect to the housing 128. The shell 126 houses a series of three locking and movement actuating devices 130 which are arranged in a manner generally similar to the devices 20, as will be indicated by the use of similar reference numerals with the suffix A for similar parts. Thus, the individual devices 130 each comprise a collet device 36A which has the straight side walls 51A and the stepped diameter side walls 53A, although in the case of this embodiment, the side wall 51A defines the internal diameter of the respective devices 36A while the wall 53A defines the external diameters of such devices. Thus, the seals 46A and 47A of the devices 36A are disposed on the exterior side of the respective devices 36A.

The respective collet devices 36A each include a sleeve 26A, piston members 44A and 45A, seal devices 46A and 47A, and seal devices 48A and 49A, the latter being in their previously indicated sealing relations between piston members 44A and 45A and abutment 38A of sleeve 57A that is applied within member 126 between locking rings 55A and 56A. The sleeves 57 each define ports 61A and 161A which lead to hydraulic actuation chambers 67A and 167A, respectively.

The sleeve 26A of each device 36A has characteristics similar to that of sleeve 26; thus, the sleeve 26A is formed with internal grooves 30A that extend longitudinally thereof, and leave relatively thin web portions 31A that connect the internal ridges 32A that are defined by the grooves 30.

The ends 56A of the collet devices 36A include annular flanges 40A and 402A which are part of sleeves 26A.

Conduits 63A and 65A extend between the respective openings of the sleeve 126A and the corresponding ports 61A and 161A of the respective sleeves 57A to provide communication between the respective actuation chambers 67A and 167A and a wobble plate type actuator of the type illustrated in FIGURE 3 which is shown in small scale block diagram form at 22A (the actual connections between being the same as shown in FIGURE 2, and consequently the tubing connections are shown in diagrammatic form only).

Th actuator 120 operates in a manner similar to that of FIGURES 1–9 except that gravity acting on the load is not involved and the collet devices work inwardly against the shaft 122, with the sleeves 26A contracting against the shaft 122 to grip same for movement in the direction dictated by the direction of rotation of the wobble plate structure 70 that forms a part of the hydraulic actuating device 22A. Shaft 122 will remain held against slippage when actuator 22A is shut off since at any one time shaft 122 will be firmly gripped by at least one device 36A.

The device 120 thus provides a way to move a smooth shaft member in either direction longitudinally thereof without any stroke limitations, and without requiring gearing or the like. For instance, if desired, the shaft 122 can be limitless in length and the hydraulic actuator unit 22A continuously operated to feed the shaft 122 in the direction desired.

SPECIFIC DESCRIPTION

Referring now more specifically to the hydraulic actuator 22, the wobble plate structure 70 comprises disc member 130 having a hub portion 131 including shoulder at 132 for engagement with an annular flange portion 134 of race member 135 of ball bearing assembly 136, which race member is provided with a raceway 137 for receiving bearing balls 139 that cooperate with raceway 141 of member 130. Disc member 130 is formed with spaced opening 143 through which piston rods 72 extend to seat on bearing seats 145 in a bearing ring 147. The disc member 130 rides on a support hub 142 that includes a tubular flange portion 144 which is journalled in bearing assembly 146 that is appropriately mounted within the portion of support member 16 that defines the wobble plate operating chamber 150.

The shaft 90 extends through the bore 152 of the tubular portion 144 and the external surface 154 of the shaft 90 substantially complements the internal surface 155 of the tubular portion 144. Shaft 90 is keyed to hub 142 in any suitable manner.

As indicated in FIGURE 3, the support hub 144 defines an inclined surface 160 that defines the normal operating inclination of the wobble plate structure 70. The surface 160 at the thickest portion of the hub 142 is formed with a ball bearing receiving groove 162 in which rides a bearing ball 166 that engages within socket 168 formed in the disc member 130. Ball 166 keys disc 130 for rotation with hub 142 and race member 135 and bearing ring 147 do not rotate.

The support hub 142 is supported by compression spring 190 that is interposed between the bearing assembly 146 and the hub 142.

The arrangement of the hydraulic actuator 22 is such that when the member 12 for any reason cannot move under the pumping action provided by the hydraulic actuation unit 22, the wobble plate structure immediately levels off so that the piston members 74 will have zero displacement. This is an automatic reaction to the pressure build up that would be achieved by the member 12 engaging an over-solid stop or the like, as might be associated with the jack 10 to limit the height that the tubular member 12 can be lifted above the support 18.

The piston rods 72 are simplified in nature and each comprises a rod member 192 having ball shaped end portions 194 at the crank ends thereof which have spherically contoured external surfaces 198. The end portions 194 seat in the spherically contoured recesses or seats 145 formed in the bearing ring 147 while the other end portions 196 are respectively affixed to piston members 74.

The proportioning of the parts of the actuator 22, the tensioning of seals 78 on being expanded, and the incompressibility of the hydraulic liquid insures that the piston rods 72 remain in operating engagement with the seats 145 of the ring 147 regardless of the position of operation of the wobble plate structure 70.

It is the intention of this invention that the jack 10 be arranged to provide a hermetically sealed arrangement and for this purpose, the ends of all static type seals, for instance, seals 46, 47, 48, 49, 66, 68 and 78 are brazed at their connections to their adjucent structures. Similarly, the rings 52 forming these seals are brazed together at their alternate edges 54 and 55 to be leak-free at these points. The result is that hydraulic liquid is hermetically sealed within the jack 10. Similar remarks apply to the embodiment of FIGURE 6.

It will therefore be seen that I have provided a linear actuator arrangement that will do the job that conventional linear actuators will do with one-third the volume of hydraulic liquid, one-half the cost, and at an efficiency on the order of 85 percent. As a matter of fact, it is the efficiency of the actuator that permits the load to lower itself insofar as the device 10 is concerned once the magnetic brake is released.

Furthermore, my linear actuator will operate under any and all load conditions from zero load to the maximum capacity of the unit with infinite load changes in between and still provide the firm hydraulic lock action or shifting action that has been herein described.

The hydraulic liquid of the actuator is hermetically sealed within the unit, and since only static seals form the hydraulic seal action, there can be no leakage during operation or at any other time.

It will now be apparent that the basic aspects of this device can not only be embodied in the structures as massive as automobile rack lifts, but it can also be embodied in push-pull devices of any convenient size, including miniaturized devices having very small diameters, and the mechanism involved is fully operable in any desired position of orientation.

The actuator provides a step-by-step pushing or pulling action which can be unlimited in stroke and when the hydraulic actuation unit is at rest, it provides a sure and effective lock against undesired movement.

The quick lock and release action provided by the collet members of each lock device 20 or 20A permits a firm gripping action for moving the member to be moved in the desired direction while at the same time providing for automatic return to neutral position of the opposed collet member.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. In a linear actuator,
a pair of members having portions of same in telescoping relation,
a hydraulic liquid filled chamber interposed between said members,
said chamber defining inner and outer side portions in force transmitting relation to said members and transversely thereof,
said chamber side portions at opposite ends of said chamber defining between the respective chamber side portions a cross-sectional area transversely of said members that is larger than that at the intermediate portion thereof,
with one of said chamber side portions being in concentric relation with one of said members and being substantially rectilinear longitudinally thereof,
and with the ratio of the difference of said areas of said chamber to the length of said one chamber side portion being no greater than the coefficient of friction between said chamber one side portion and said one member,
a poston interposed between each end of said chamber and said intermediate portion thereof with said pistons being in force transmitting relation to said one of said chamber side portions and being mounted for movement longitudinally of said members,
and means for selectively and simultaneously supplying and withdrawing hydraulic liquid to and from opposing sides of said pistons in equivalent proportions to move said one member with respect to the other member.

2. The actuator set forth in claim 1 wherein:
said chamber and pistons comprise a hydraulic collet device,
and wherein a plurality of said devices are interposed between said members in end to end relation longitudinally of said portions of said members,
and wherein said hydraulic liquid supplying and withdrawing means includes means for supplying hydraulic liquid to like ones of said sides of the pistons at one end of the respective chambers and withdrawing the same amount of hydraulic liquid from the other of said sides of the pistons at the other ends of the respective chambers.

3. The actuator set forth in claim 2 wherein:
said liquid hydraulic supplying and withdrawing means further includes:
means for blendingly relating the supply and withdrawal of hydraulic liquid to and from said pistons of the respective devices.

4. The actuator set forth in claim 3 wherein:
said supply and withdrawal means comprises:
a piston chamber for each of said sides of said pistons,
said piston sides each defining a portion of separate hydraulic actuation chambers,
a conduit communicating between each of said actuation chambers and its piston chamber,
each of said piston chambers having a piston member reciprocably mounted therein,
and means for reciprocating said piston members, with the other sides of said pistons respectively being in force transmitting relation to the respective liquid filled chambers.

5. The actuator set forth in claim 4 wherein:
said liquid filled chambers are hermetically sealed, and said actuation chambers, said conduits, and said piston chambers comprise a hermetically sealed liquid filled system.

6. The actuator set forth in claim 5 including:
static seal means cooperating with said piston members for sealing off the liquid in said piston chambers.

7. In a linear actuator,
a pair of inner and outer telescoping members,
an annular hermetically sealed, hydraulic liquid filled chamber interposed between said members,
said chamber defining inner and outer side portions in force transmitting relation to said members, and transversely thereof,
said chamber side portions at opposite ends of said chamber defining between the respective chamber side portions a cross-sectional area transversely of said members that is larger than that at the intermediate portion thereof,
with said outer side portion being in concentric relation with the outer of said members and being substantially rectilinear longitudinally thereof,
and with the ratio of the difference of said areas of the respective chambers to the length of said outer side portion thereof being no greater than the coefficient of friction between said outer side portion and the outer of said members,
a piston interposed between each end of said chamber and said intermediate portion thereof and being mounted for movement longitudinally of said members, said pistons being in force transmitting relation to said inner chamber side portion with opposing sides of said pistons each forming a part of a piston actuation chamber, and means for selectively and simultaneously supplying and withdrawing hydraulic liquid to and from said piston actuation chambers in equivalent proportions to move said outer member with respect to said inner member.

8. In a linear actuator, a pair of inner and outer telescoping members, an annular, hermetically sealed, hydraulic liquid filled chamber interposed between said members, said chamber defining inner and outer side portions in force transmitting relation to said members, and transversely thereof, said chamber side portions at opposite ends of said chamber defining between the respective chamber side portions a cross-sectional area transversely of said members that is larger than that at the intermediate portion thereof, with said inner side portion being in concentric relation with the inner of said members and being substantially rectilinear longitudinally thereof, and with the ratio of the difference of said areas of the respective chambers to the length of said inner side portion thereof being no greater than the coefficient of friction between the respective inner side portions and the inner of said members, a piston interposed between each end of said chamber and said intermediate portion thereof and being mounted for movement longitudinally of said members, said pistons being in force transmitting relation to said outer chamber side portion, with opposing sides of said pistons each forming a part of a piston actuation chamber, and means for selectively and simultaneously supplying and withdrawing hydraulic liquid to and from said piston actuation chambers in equivalent proportion to move said inner member with respect to said outer members.

9. A hydraulic wedge device comprising:

an annular hollow chamber defining inner and outer side portions in which one of said side portions is substantially rectilinear longitudinally of the axis of said chamber, with the side portion comprising a pair of spaced pistons movable longitudinally of said axis on either side of a stationary member and diaphragm means connecting the opposing sides of the respective pistons with said stationary member, with the other sides of said pistons being within said chamber, said chamber one side portion being defined by a metallic wall of film dimensions.

10. In a linear actuator, a pair of members having portions of same in telescoping relation, a hydraulic liquid filled chamber interposed between said members, said chamber defining inner and outer side portions in force transmitting relation to said members and transversely thereof, with the ratio of the effective width of said chamber transversely of said walls to the area of said chamber one side portion that is in said force transmitting relation being no greater than about the coefficient of friction between said chamber one side portion and said one member, with one of said chamber side portions being in concentric relation with one of said members and being substantially rectilinear longitudinally thereof, with the other side portion of said chamber comprising:

an abutment member fixed with respect to the other of said members and interposed between same and said chamber one side portion, a pair of pistons interposed between said chamber one side portion and said other member and spaced from said abutment member, diaphragm means connected between the respective pistons and said abutment member for establishing a flexible static liquid seal therebetween, and diaphragm means connected between the respective pistons and said one side portion of said chamber for establishing a flexible static liquid seal therebetween, with portions of the opposing sides of said pistons being exterior of said chamber and portions of the other sides of said pistons being in force transmitting relation to said chamber, and means for selectively and simultaneously supplying and withdrawing hydraulic liquid to and from force transmitting relation to said opposing sides of said pistons in equivalent proportions to move said one member with respect to the other member.

11. In a linear actuator, a pair of members having portions of same in telescoping relation, one of said members being movable relative to the other member, hydraulic liquid filled chamber means interposed between said members for releasably securing said members against relative movement therebetween under an infinite variety of load conditions between zero load and maximum design load conditions of said actuator and for moving said one member relative to the other member under said load conditions, said chamber means defining inner and outer side portions in force transmitting relation to said members and transversely thereof, with one of said chamber means side portions being in substantial concentric relation with one of said members and being substantially rectilinear longitudinally thereof, with the ratio of the effective compressing width area of said chamber means transversely of said walls to the area of said chamber means one side portion that is in said force transmitting relation being no greater than about the coefficient of friction between said chamber means one side portion and said one member, piston means in force transmitting relation to said chamber means for effecting a hydraulic lock between said members, said piston means being movable longitudinally of said members and being coupled to said chamber means, and means for selectively and simultaneously supplying and withdrawing hydraulic liquid to and from force transmitting relation to said opposing sides of said piston means in equivalent proportions to move said one member with respect to the other member under said infinite variety of load conditions.

12. The actuator set forth in claim 11 wherein:

said chamber means and said supplying and withdrawing means are hermetically sealed devices.

No references cited.

EDGAR W. GEOGHEGAN, *Primary Examiner.*